United States Patent [19]

Schneider

[11] Patent Number: 4,993,919

[45] Date of Patent: Feb. 19, 1991

[54] DISCRETE (ON-OFF) FEATHER SIGNAL TO GOVERN PROPELLER OVERSPEED

[75] Inventor: Roy W. Schneider, Ellington, Conn.

[73] Assignee: United Technologies Corporation, Hartford, Conn.

[21] Appl. No.: 336,271

[22] Filed: Apr. 11, 1989

[51] Int. Cl.⁵ .................... F01B 25/00; B63H 3/00
[52] U.S. Cl. .................................. 416/35; 415/17; 417/42
[58] Field of Search ............... 416/35, 44, 38; 415/17; 417/42

[56] References Cited

U.S. PATENT DOCUMENTS 2,738,183  3/1956  Quinn et al. .............. 416/35 X
2,949,159  8/1960  Kessler et al. ............ 416/35

Primary Examiner—William E. Wayner
Attorney, Agent, or Firm—Ronald R. Snider

[57] ABSTRACT

A propeller overspeed governor logic and control is described in this invention. A method is shown for providing a variable propeller pitch rate from a discrete pitch command to improve governing dynamic characteristics.

7 Claims, 3 Drawing Sheets

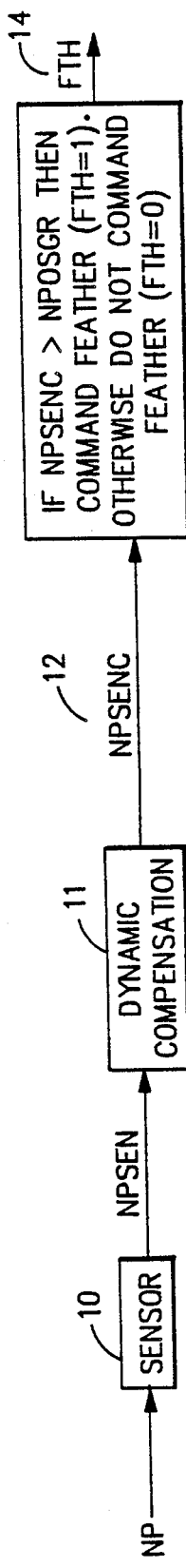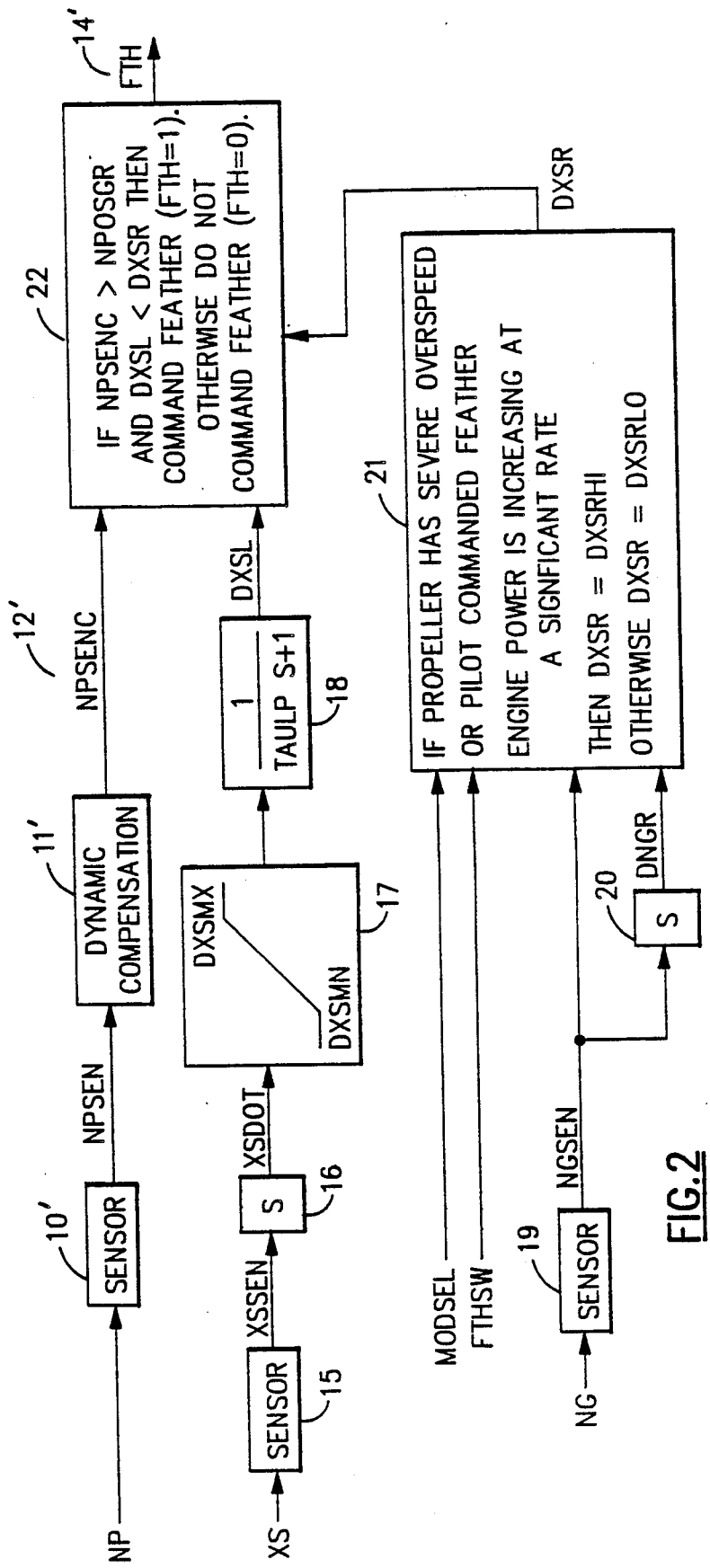
FIG.1 PRIOR ART
FIG.2

CONTROL LOGIC PROPELLER OVERSPEED GOVERNOR

DISCRETE (ON-OFF) FEATHER SIGNAL TO GOVERN PROPELLER OVERSPEED

DESCRIPTION

1. Technical Field

This invention relates to a secondary governor which is a safety requirement for propeller driven aircraft. The secondary governor prevents severe overspeed when the primary propeller speed governor fails.

2. Background Art

In the art of secondary or overspeed governors for propeller speed, it is known to provide such governing by switching on and off the existing discrete feather command signal to control propeller pitch. The problem with this approach is that the control characteristics of the on/off discrete feather command result in significant oscillation in propeller governing speed. In the prior art, a governor utilizing a discrete (on/off) signal would command feather (on) when propeller speed exceeded the reference speed, and delete feather command (off) when speed is less than the reference speed. This form of secondary governor requires dynamic compensation which would be included in the speed governing control laws. A block diagram of this type of governor is shown in FIG. 1. In this prior art control, the signal to the feather command is based upon reference speed and a measured compensated propeller speed only.

DISCLOSURE OF THE INVENTION

An object of this invention is to provide control laws to significantly reduce the speed oscillation inherent in prior art governors utilizing discrete (on/off) control. In the prior art, the large speed oscillations are caused by the high pitch rate associated with the discrete (on/off) control.

It is a further object of this invention to provide control logic that defines the average increase-pitch rate. A low average increase-pitch rate is desired when small speed oscillations are desired. A high average increase-pitch rate is desired for some transient conditions such as severe overspeed.

According to the present invention, there is a new control concept which uses logic to yield an increase-pitch rate that is significantly less than the slew rate capability of the pitch actuator. In effect, the discrete feather signal is switched "on" and "off" to yield this slower average increase-pitch rate when the speed governor commands an increase in pitch. This invention provides control logic to compute a desired average increase-pitch rate. A pitch position sensor and control laws compute the actual average increase-pitch rate. Then additional control logic switches the discrete feather command signal on and off so that the actual average increase-pitch rate (DXSL) is equal to the desired average increase-pitch rate (DXSR).

The foregoing and other objects, features and advantages of the present invention will become more apparent in the light of the foregoing description of the preferred embodiments thereof as illustrated in the accompanying drawings.

BRIEF DESCRIPTION OF THE DRAWINGS

FIG. 1 shows a block diagram of a typical governor utilizing a discrete output command as used in the prior art.

FIG. 2 shows a block diagram of a governor in accordance with this invention.

BEST MODE FOR CARRYING OUT THE INVENTION

Figure 3:
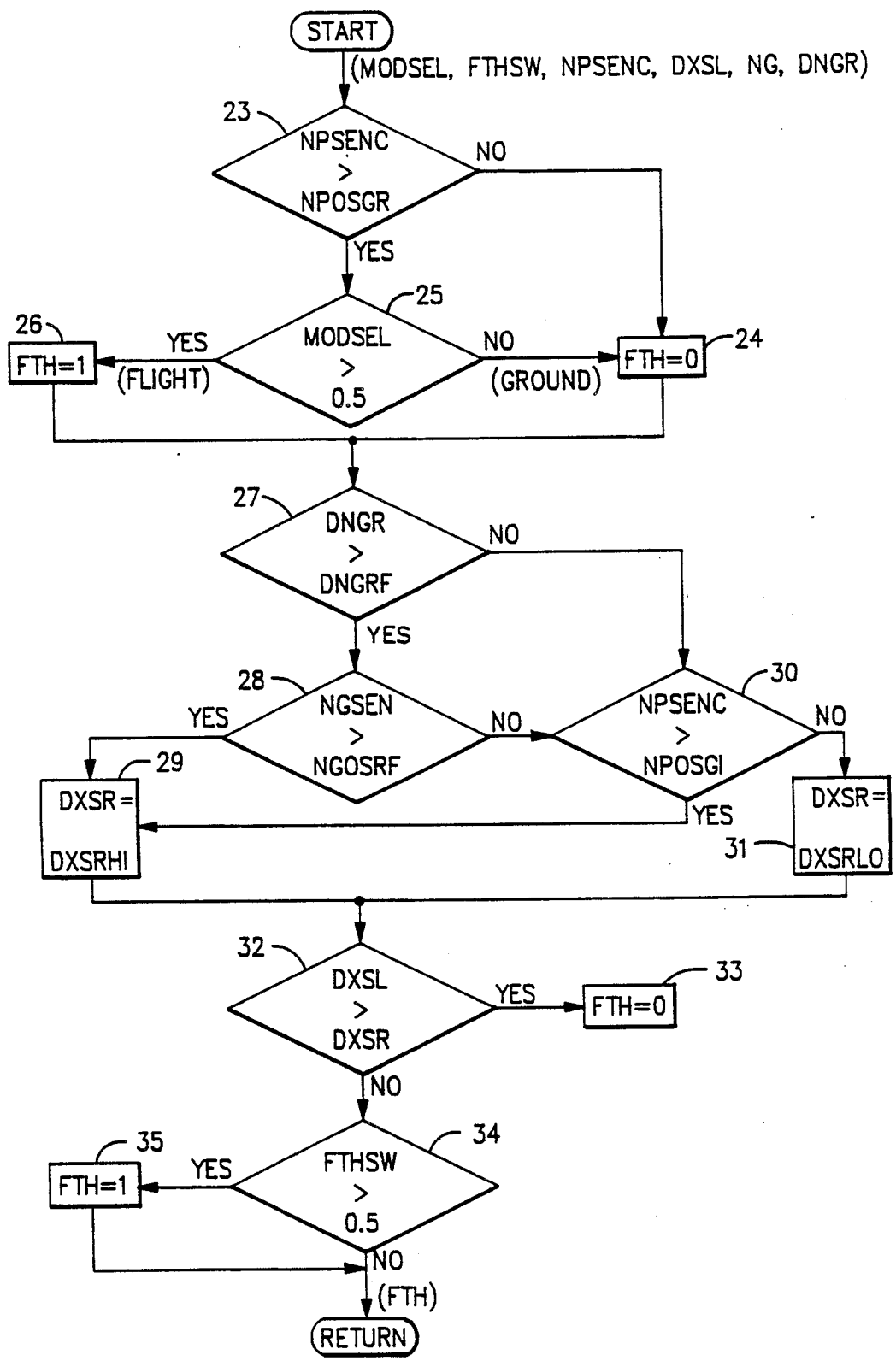
FIG. 3 shows a flowchart of the control logic depicted in FIG. 2.

FIG. 1 shows a block diagram for the control as used in the prior art. The propeller speed NP is sensed at block 10 and is dynamically compensated at block 11. The dynamic compensation is usually lead compensation. The output from block 11 is a compensated sensed propeller speed NPSENC 12, which is the input to the control logic, block 13. The control logic in block 13 compares NPSENC to the propeller overspeed governor reference NPOSGR and sets the discrete signal FTH equal to one whenever NPSENC is greater than NPOSGR. The output from logic 13 is a discrete signal FTH (14) that commands feather whenever FTH=1.

TABLE OF TERMS USED IN THIS APPLICATION

XS: Pitch Actuator Position
XSDOT: Sensed Pitch Actuator RAte Signal
DXSL: Sensed Actuator Increase Pitch Rate; Average Increase Pitch Rate; Pitch Actuator Average, Dashed line FIGS. 4A, 4B
MODSEL: On Ground or in Flight Sensor
FTHSW: Discrete Signal Commands Propeller Pitch to Increase
NG: Gas Generator Speed
NGSEN: Sensed Gas GEnerator Speed
NP: Propeller Speed
NPSENC: Compensated Sensed Propeller Speed
DNGR: Rate of Gas Generator Sensed Speed; Derivative of NGSEN
NPOSGR: Propeller Overspeed Governor Reference
FTH: Discrete Signal-Feather-Commands Feather
XSSEN: Sensed ACtuator Position Signal
DXSMX: Maximum Value DXSDOT
DXSMN: Minimum Value DXSDOT
DXSR: Actuator Desired Increase Pitch Rate-Desired Average Increase Pitch Rate
DNGRF: Derivative of Gas Generator Rate Reference
NGOSRF: Gas Generator Overspeed Reference
DXSRHI: High Fixed Value to Which Actuator Desired Average Increase Pitch Rate is Set
NPOSG1: Severe Overspeed Reference
DXSRLO: Low Rate-Fixed Value-Actuator Desired Average Decrease Pitch Rate is Set Referring now to FIG. 2 there is shown blocks 10', 11' and 12' which are the same as those in the prior art shown in FIG. 1. Similarly, the propeller speed NP, the overspeed governor reference speed (NPOSGR) in FIG. 2 block 22, and the output signal from block 22 FTH are the same as shown in FIG. 1.

The pitch actuator is linked to each of the propeller blades so that propeller pitch is a unique function of propeller pitch actuator position XS. Therefore, utilizing pitch actuator position is equivalent to using propeller pitch in the logic in FIG. 2. The pitch actuator position XS is sensed at block 15 yielding a sensed actuator position signal XSSEN. At block 16, the time derivative is taken of the sensed pitch actuator position XSSEN to yield a sensed pitch actuator rate signal XSDOT. The magnitude of XSDOT is limited in block 17 to a maximum value of DXSMX and a minimum value of DXSMN. Block 18 contains a first order lag with time constant TAULP used as a low-pass filter to delete the higher frequencies from XSDOT and yield a filtered sensed pitch rate signal DXSL. The combination of blocks 15, 16, 17 and 18 provide a measurement of the pitch actuator increase-pitch average rate DXSL.

Engine gas generator speed NG is sensed at block 19 yielding a sensed gas generator speed NGSEN. Block 20 provides a derivative of NGSEN, yielding the rate of gas generator sensed speed DNGR. The combination of block 21 and block 22 contain the logic to compute the discrete feather command signal FTH (14') from the previously defined input signals NPSENC, DXSL, NGSEN and DNGR. Additional input signals to block 21 are a discrete signal MODSEL indicating either flight mode or ground mode and a discrete signal FTHSW which commands propeller pitch to increase to the feather position. A detailed description of the logic in block 21 and block 22 is provided in FIG. 3. Block 21 in FIG. 2 contains the portion of the control logic to define the actuator desired increase-pitch rate, DXSR. The value of DXSR is a low rate when speed oscillations are to be minimized. The value of DXSR is a high rate (near slew rate) for certain transient conditions. These transient conditions include a severe propeller overspeed, feather is commanded, or an increase in engine power is commanded. One such condition is when the compensated sensed propeller speed signal NPSENC indicates a severe overspeed has occurred. A second such command is to feather the propeller pitch independent of the propeller speed governor. A third operating condition is when operation requires a very rapid increase in engine power. This operating condition is usually at low altitude, low flight speed with rapid engine acceleration.

The control logic in block 21 has computed the desired average increase-pitch rate DXSR. This disclosure is of the computation of a desired average increase rate DXSR. Any other control laws and logic which compute a multi-valued desired average increase-pitch rate DXSR may be used.

Block 22 contains the portion of the control logic that computes the discrete feather command signal FTH 14' from NPSENC, DXSL and DXSR. The logic in block 22 compares NPSENC to NPOSGR as in the prior art FIG. 1 block 13 and also compares DXSL to DXSR. The discrete feather command FTH commands feather whenever compensated sensed speed NPSENC is greater than the overspeed reference NPOSGR and also sensed actuator average increase-pitch rate DXSL is less than the actuator desired increase-pitch rate DXSR.

A detailed flowchart in FIG. 3 shows the logic previously described in general terms in FIG. 2 block 21 and block 22. Referring to FIG. 3, the discrete feather command signal FTH is computed from the input signals MODSEL, FTHSW, NPSENC, DXSL, NGSEN and DNGR.

In FIG. 3, block 23, the sensed propeller speed compensated (NPSENC) is compared to the overspeed governor reference propeller speed NPOSGR. When the sensed speed (NPSENC) does not exceed the governor reference speed (NPOSGR), the feather signal FTH is set to zero at block 24. At block 25 the mode select (MODSEL) which indicates ground-mode or flight-mode is compared to 0.5. When the MODSEL is zero, the aircraft is in the ground mode, and FTH is set to zero at block 24. Conversely, when MODSEL is greater than 0.5, the aircraft is known to be in the flight mode, and at block 26, FTH is set to one. At block 27 the derivative of the gas generator speed or the gas generator rate (DNGR) is compared to the derivative of the gas generator rate reference, DNGRF. At block 28 the gas generator sensed speed NGSEN is compared to the gas generator speed reference (NGOSRF). Gas generator speed greater than NGOSRF will produce a significant engine power. If the gas generator sensed speed NGSEN in greater than the reference NGOSRF and DNGR is greater than DNGRF, a significant increase in power is occurring and DXSR is set equal to DXSRHI in block 29. This commands a high value for the desired increase-pitch rate DXSR. Referring again back to block 27, when DNGR is not greater than DNGRF or when block 28 indicates NGSEN is not greater than NGOSRF, then there is no significant increase in engine power and control passes to block 30. Compensated sensed propeller speed NPSENC is compared to the severe-overspeed reference NPOSG1 in block 30. When NPSENC is greater than NPOSG1, there is a severe propeller overspeed and desired average increase-pitch rate DXSR is set equal to a high rate DXSRHI at block 29. Otherwise DXSR is set equal to low rate DXSRLO at block 31. At block 32, pitch actuator sensed increase-pitch rate DXSL of block 18 in FIG. 2 is compared to the desired increase pitch rate DXSR which was previously set at a high or low value in blocks 29 and 31. When DXSL is greater than DXSR, the average increase-pitch rate is too fast and FTH is set equal to zero in block 33, then control moves to block 34. When DXSL is less than DXSR in block 32, the average increase-pitch rate is too slow, then control moves to block 34. The discrete feather command FTHSW is compared to 0.5 in block 34. FTHSW is a discrete signal commanded by the pilot and has a value of one when requesting the pitch to go to the feather position. When FTHSW is greater than 0.5, FTH is set to one in block 35. The previous description shows that the logic in FIG. 3 has set the discrete feather command signal FTH to be zero when an increase-pitch is not required and set FTH to be one when an increase-pitch is required.

Figure 4A:
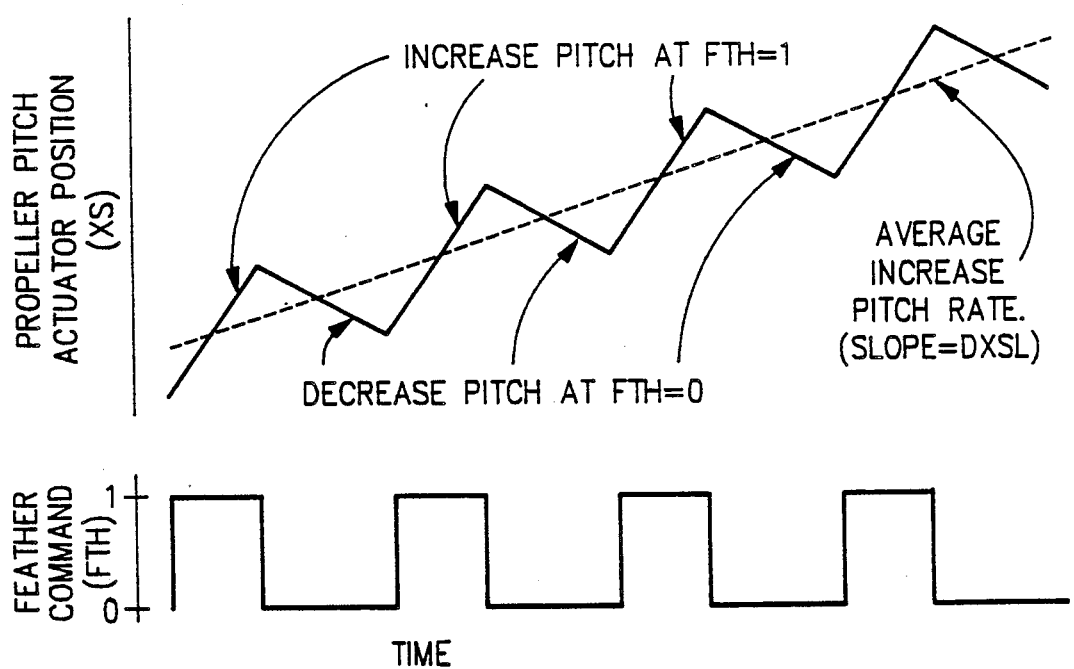
FIGS. 4A and 4B are graphic displays showing how a discrete feather signal can provide low or high increase-pitch rate.
Figure 4B:
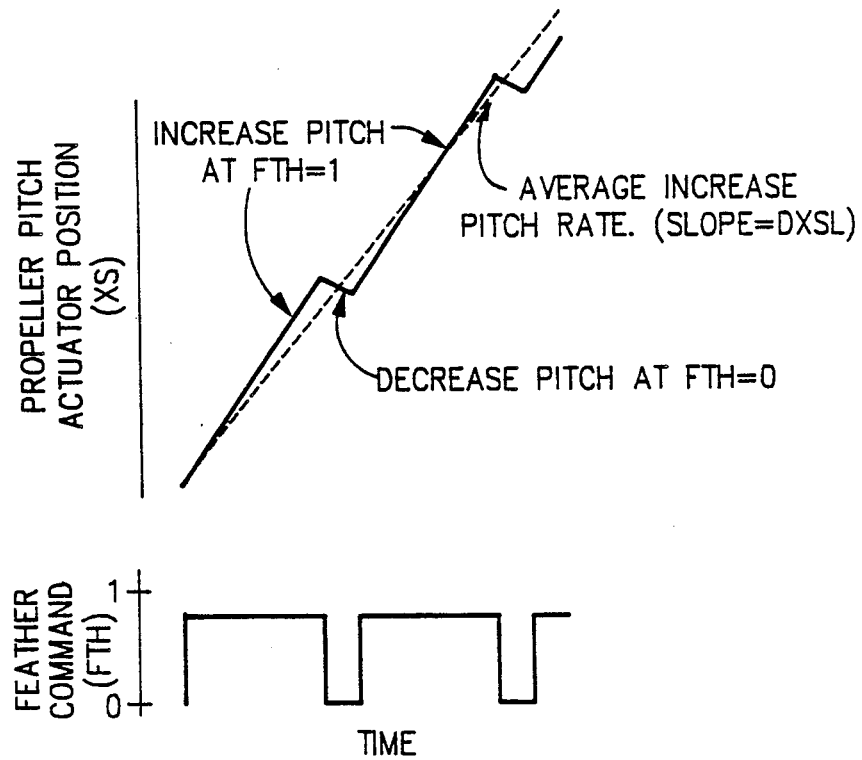

FIGS. 4A and 4B are pictorial descriptions showing how the on/off discrete feather signal FTH can provide a low average increase-pitch rate DXSRLO or a high average increase-pitch rate DXSHRI. FIGS. 4A and 4B each contain plots of pitch actuator position XS and feather command signal FTH versus time. The slope of the pitch actuator position line in these plots is the rate of change of actuator position with time which is pitch actuator rate. An increase in pitch actuator position with time is an increase-pitch rate and has a positive slope in FIGS. 4A and 4B. A decrease in pitch actuator position with time is a decrease-pitch rate and has a negative slope. The plot of feather command signal FTH shows the time intervals when FTH has a value of 0 or 1. These figures show that FTH=1 commands the pitch actuator to increase toward the feather position and has a maximum increase-pitch rate. Time intervals when FTH=0 have deleted the feather command and the actuator pitch rate is then determined by the characteristics of the primary governor. These figures assume a failed primary governor erroneously commanding a decrease in pitch. The resulting decrease-pitch rate is dependent on the primary governor failure characteristics. A primary governor failure yielding a constant decrease-pitch rate is assumed and shown as a constant negative slope in FIGS. 4A and 4B. The zero/one cycling of FTH causes the pitch actuator to cycle between increasing pitch (a positive slope) and decreasing pitch (a negative slope). The pitch actuator average position is identified by a dashed line and the slope of this dashed line is the average increase-pitch rate DXSL. FIG. 4A shows the average increase-pitch rate is much less than the increase-pitch rate occurring when FTH=1; and is representative of an average increase-pitch rate having a value of DXSRLO. FIG. 4B shows the average increse-pitch rate (DXSL) is nearly the same as the increase-pitch rate occurring when FTH=1, and is representative of an increase-pitch rate having a value of DXSRHI. A comparison of FIGS. 4A and 4B shows that the average increase-pitch rate (DXSL) is related to the portion of the time interval that FTH=1. A decrease in the portion of time interval that FTH=1 will result in a smaller average increase-pitch rate.

Although the invention has been shown and described with respect to a best mode embodiment thereof, it should be understood by those skilled in the art that the foregoing and various other changes, omissions and deletions in the form and detail thereof may be made therein without departing from the spirit and scope of this invention.

I claim:

1. Apparatus for governing propeller speed by feathering propeller blade pitch, comprising:
    propeller speed sensor means, for providing a propeller speed signal indicative of the propeller speed;
    propeller overspeed means, for comparing said propeller speed signal to a predetermined governor reference speed signal to determine an occurrence of a propeller overspeed condition;
    propeller pitch sensor means, for providing a propeller pitch signal indicative of the propeller pitch;
    propeller pitch rate means, for comparing the average rate of said propeller pitch signal to a predetermined reference average pitch rate signal to determine an occurrence of an average pitch rate excess condition; and
    feather command means, responsive to both said propeller overspeed means and said propeller pitch rate means, for providing a feather command signal when both said propeller overspeed condition and said average pitch rate excess condition have occurred.

2. Apparatus according to claim 1, further comprising:
    engine speed sensor means, for providing an engine speed signal indicative of engine speed;
    engine rate means, for comparing the rate of said engine speed signal to a predetermined reference engine rate signal to determine an occurrence of an engine rate excess condition;
    engine speed means, for comparing said engine speed signal to a predetermined reference engine speed signal to determine an occurrence of an engine speed excess condition;
    severe-overspeed means, responsive to said propeller speed signal, for comparing said propeller speed signal to a predetermined severe-overspeed reference speed signal to determine an occurrence of a severe-overspeed condition; and
    average pitch rate logic means, responsive to said engine rate means, said engine speed means, and said severe-overspeed means, for providing said predetermined reference average pitch signal.

3. Apparatus according to claim 2, wherein said predetermined reference average pitch rate signal is indicative of a first predetermined reference average pitch rate upon an occurrence of said engine speed excess condition and said engine rate excess condition or upon an occurrence of said severe-overspeed condition, otherwise said predetermined reference average pitch rate signal is indicative of a second predetermined reference average pitch rate, said first predetermined reference average pitch rate being greater than said second predetermined reference average pitch rate.

4. Apparatus according to claim 1, further comprising:
    mode select means, for inhibiting said feather command signal during ground operations.

5. Apparatus according to claim 1, wherein said apparatus for governing propeller speed is employed when a primary speed governor fails.

6. A method for governing propeller speed when a primary speed governor fails, comprising:
    detecting an overspeed condition;
    selecting a predetermined reference average pitch rate;
    measuring an average propeller pitch rate; and
    actuating a feather command signal so that said average propeller pitch rate is indicative of said predetermined reference average increase-pitch rate.

7. The method for governing propeller speed according to claim 6, wherein said overspeed condition is at a higher value than the value of an overspeed condition of the primary speed governor, whereby the method for governing propeller speed protects against overspeed in the event of a malfunction of the primary governor.

* * * * *